United States Patent [19]
Hwang et al.

[11] Patent Number: 5,883,188
[45] Date of Patent: Mar. 16, 1999

[54] PAINTABLE OLEFINIC INTERPOLYMER COMPOSITIONS

[75] Inventors: Yuh-Chin Hwang, Taipei, Taiwan; Stephen R. Betso, Horgen, Switzerland; Thomas J. McKeand, Jr., Freeport, Tex.; H. Craig Silvis, Midland, Mich.; Deepak R. Parikh, Lake Jackson, Tex.; Don J. Germano, Lake Jackson, Tex.; Seema V. Karande, Lake Jackson, Tex.

[73] Assignees: The Dow Chemical Company, Midland, Mich.; Dow Europe S.A., Horgen, Switzerland

[21] Appl. No.: 926,760

[22] Filed: Sep. 10, 1997

Related U.S. Application Data

[63] Continuation-in-part of Ser. No. 337,354, Nov. 10, 1994, abandoned, which is a continuation-in-part of Ser. No. 54,384, Apr. 28, 1993, Pat. No. 5,424,362.

[51] Int. Cl.$^6$ .................................................. C08L 51/00
[52] U.S. Cl. ............................... 525/71; 525/74; 525/78; 525/80; 525/57; 525/221; 428/523
[58] Field of Search ................................. 525/74, 78, 80, 525/221, 57; 428/523

[56] References Cited

U.S. PATENT DOCUMENTS

| | | |
|---|---|---|
| 3,236,917 | 2/1966 | Natta et al. . |
| 3,264,272 | 8/1966 | Rees . |
| 3,520,861 | 7/1970 | Thomson et al. . |
| 3,645,992 | 2/1972 | Elston . |
| 3,873,643 | 3/1975 | Wu et al. . |
| 4,026,967 | 5/1977 | Flexman, Jr. et al. . |
| 4,230,830 | 10/1980 | Tanny et al. .......................... 525/222 |
| 4,237,037 | 12/1980 | Takahashi . |
| 4,248,990 | 2/1981 | Pieski et al. ........................... 526/317 |
| 4,252,924 | 2/1981 | Chatterjee .............................. 526/65 |
| 4,423,185 | 12/1983 | Matsumoto et al. ................... 525/66 |
| 4,762,890 | 8/1988 | Strait et al. ........................... 525/257 |
| 4,883,837 | 11/1989 | Zabrocki ................................ 525/66 |
| 4,888,391 | 12/1989 | Domine et al. ...................... 525/221 |
| 4,916,208 | 4/1990 | Klingensmith ....................... 528/392 |
| 4,927,888 | 5/1990 | Strait et al. .......................... 525/285 |
| 4,945,005 | 7/1990 | Aleckner, Jr. et al. ............... 428/500 |
| 4,946,896 | 8/1990 | Mitsuno et al. ....................... 525/93 |
| 4,950,541 | 8/1990 | Tabor et al. ......................... 428/373 |
| 4,975,207 | 12/1990 | Lee ...................................... 524/494 |
| 4,997,720 | 3/1991 | Bourbonais et al. ................. 428/500 |
| 5,089,321 | 2/1992 | Chum et al. ......................... 428/218 |
| 5,089,566 | 2/1992 | Tabor et al. .......................... 525/64 |
| 5,100,050 | 4/1992 | Takahashi et al. ................... 524/425 |
| 5,194,509 | 3/1993 | Hasenbein et al. .................. 525/285 |
| 5,272,236 | 12/1993 | Lai et al. ........................... 526/348.5 |
| 5,278,272 | 1/1994 | Lai et al. ........................... 526/348.5 |
| 5,346,963 | 9/1994 | Hughes et al. ...................... 525/285 |
| 5,424,362 | 6/1995 | Hwang et al. ........................ 525/71 |

FOREIGN PATENT DOCUMENTS

| | | |
|---|---|---|
| 0 058 980 A1 | 9/1982 | European Pat. Off. . |
| 0 157 655 A2 | 10/1985 | European Pat. Off. . |
| 0 213 720 A2 | 3/1987 | European Pat. Off. . |
| 0 243 206 A2 | 10/1987 | European Pat. Off. . |
| 0 344 756 A2 | 12/1989 | European Pat. Off. . |
| 0 508 415 A2 | 10/1992 | European Pat. Off. . |
| 65-0 131 033 | 10/1980 | Japan . |
| 88/07564 A1 | 10/1988 | WIPO . |
| 93/25617 A2 | 12/1993 | WIPO . |
| 93/25617 A3 | 12/1993 | WIPO . |

OTHER PUBLICATIONS

International Search Report dated 2 Sep. 1994 issued by the EPO acting as the International Searching Authority in PCT/US94/04025.
International Search Report dated 10 Feb. 1994 issued by the EPO acting as the International Searching Authority in PCT/US93/05363.
Abstract of Japanese Patent Application No. 01–221,475 (Sep. 4, 1989).
Abstract of Japanese Patent Application No. 61–076,557 (Apr. 19, 1986).
Abstract of Japanese Patent Application No. 60–051,729 (Mar. 23, 1985).
Abstract of U.S. Patent No. 4,299,754 (Oct. 11, 1981).
Abstract of Japanese Patent Application No. 54–000,085 (Jan. 5, 1979).
Abstract of Belgium Patent Application No. 80–9005 (Apr. 16, 1974).
General Motors Engineering Standards, "Dime Scrape Test to Determine Paint Adhesion: Brittleness–GM–9506–P", Jul. 1986.
General Motors Engineering Standards, "Water Immersion Test–GM–4466–P", Mar. 1987.
Admer® Resins (promotional pamphlet) by Mitsu Petrochemical.

(List continued on next page.)

Primary Examiner—Mark L. Warzel

[57] ABSTRACT

Paintable thermoplastic polyolefin compositions are disclosed which comprise (i) about 20 to about 70 wt % of at least one graft-modified polypropylene, (ii) about 10 to about 40 wt % of at least one nongrafted or graft-modified homogeneously branched linear ethylene polymer, ethylene-propylene monomer rubber, ethylene-propylene-diene monomer rubber, heterogeneously branched linear ethylene polymer, styrene block copolymer, or a combination thereof and (iii) about 5 to about 50 wt % of an interpolymer of ethylene and an $\alpha,\beta$-unsaturated carbonyl copolymer, e.g. a copolymer of ethylene and acrylic acid. The polypropylene and, optionally the homogeneously branched linear ethylene polymer, ethylene-propylene monomer rubber, ethylene-propylene-diene monomer rubber, heterogeneously branched linear ethylene polymer, and styrene block copolymer are grafted with an unsaturated organic compound containing at least one site of ethylenic unsaturation and at least one carbonyl group, e.g. maleic anhydride. The compositions exhibit excellent paintability with conventional paints without prior application of a primer or surface treatment, good heat resistance, good low temperature impact resistance, and they can be recycled by melt blending the compositions with thermoplastic materials, e.g., in an extruder.

22 Claims, No Drawings

OTHER PUBLICATIONS

Admer™ Adhesive Resin (promotional pamphlet) by Mitsui Petrochemical.

Swarzmiller et al., "The Compatability of Styrenic Refrigerator Liners with HCFC Blown Polyurethane Foam", pp. 3–6.

Pellethane* Polyurethane Elastomers, Promotional Brochure by The Dow Chemical Company.

PAINTABLE OLEFINIC INTERPOLYMER COMPOSITIONS

CROSS-REFERENCE TO RELATED APPLICATIONS

This application is a continuation in part of application Ser. No. 08/337,354, filed on Nov. 10, 1994, abandoned, which is a continuation in part of application Ser. No. 08/054,384, filed on Apr. 28, 1993, now U.S. Pat. No. 5,424,262.

BACKGROUND OF THE INVENTION

This invention relates to paintable compositions. In one aspect, the invention relates to paintable compositions comprising (a) polypropylene; (b) a homogeneously branched linear ethylene polymer, ethylene-propylene monomer rubber, ethylene-propylene-diene monomer rubber, heterogeneously branched linear ethylene polymer, styrene block copolymer, or combination thereof; and (c) an interpolymer of ethylene and an $\alpha,\beta$-unsaturated carbonyl, in which the polypropylene and optionally the polymer of component (b) are grafted with an unsaturated organic compound containing a carbonyl group, e.g. maleic anhydride. In yet another aspect, the invention relates to articles fabricated from these paintable compositions.

Thermoplastic polyolefins (TPO'S) have many desirable properties, e.g. light weight, durability, low cost, etc., that make them an attractive material of construction for many consumer goods, e.g. interior and exterior automotive parts, decorative fascia for household appliances, and the like. However because of their nonpolar nature, TPOs do not readily accept paint or decorative print. Most paints and inks are polar in nature, and thus require a surface with some degree of polarity before it can adhere to the surface with any degree of desirable fastness.

In the past, this problem has been addressed from a number of different directions. One typical and effective method of applying a paint to a TPO is first to apply a primer to the TPO. Primer materials are typically compositions containing a halogenated polyolefin and an aromatic solvent. While widely recognized as effective, primers are expensive and their application is an extra step in the finishing of the TPO article.

Another effective approach is to subject the surface of a TPO article to a physical or chemical treatment, such as etching with a chemical abrasive or irradiating with a plasma. While generally effective, these methods are more complex in nature than the application of a primer, and thus more difficult to control in terms of quality and consistency from part to part.

Another approach is to modify the physical and/or chemical properties of the TPO either by blending it with other thermoplastic polymers, or by incorporating into one or more polar groups, or both. For example, U.S. Pat. No. 4,946,896 to Mitsuno, et al. teaches a paintable TPO comprising 20–80 weight percent (wt %) polypropylene; 5–38 wt % of an ethylene copolymer consisting of ethylene, an ester unit of either alkyl acrylate or methacrylate, and an unsaturated dicarboxylic acid anhydride; and 5–70 wt % ethylene-propylene rubber. U.S. Pat. No. 4,888,391 to Domine, et al. teaches a paintable polyolefin composition comprising a blend of a polyolefin as the continuous phase with an ethylene/acrylate/acrylic acid terpolymer as the discontinuous phase. U.S. Pat. No. 4,945,005 to Aleckner, Jr., et al. teaches paintable TPOs comprising 2–25 wt % of a copolymer of an ethylenically unsaturated carboxylic acid and ethylene; 3–50 wt % of an ethylene $\alpha,\beta$-olefin copolymer; optionally a crystalline homopolymer or copolymer of propylene; 5–50 wt % of an inorganic filler; and 10–35 wt % of a polyethylene or a copolymer of ethylene and an alpha-olefin. PCT/US93/05363 (Publication No. WO 93/25617) teaches a paintable polyethylene comprising at least 50 wt % polyethylene grafted with at least about 0.01 wt %, based on the weight of the polyethylene, of an unsaturated organic compound containing at least one double bond and at least one functional acid group, e.g. maleic anhydride, and at least one thermoplastic polymer containing polar groups, e.g. polyurethane. Each of these disclosures are incorporated herein by reference.

While these and other modified TPO compositions all demonstrate some degree of efficacy, a continuing interest exists in identifying and developing new paintable TPOS.

SUMMARY OF THE INVENTION

According to this invention, a paintable, thermoplastic polyolefin composition consists essentially of, in weight percent (wt %),based upon the total weight of the composition:

A. about 30 to about 70 percent of at least one graft-modified polypropylene;

B. about 10 to about 40 percent of at least one nongrafted or graft-modified homogeneously branched linear ethylene polymer, ethylene-propylene monomer rubber, ethylene-propylene-diene monomer rubber, heterogeneously branched linear ethylene polymer, styrene block copolymer, or a combination thereof; and C. 5 to about 50 percent of an interpolymer of ethylene and an $\alpha,\beta$-unsaturated carbonyl monomer; with the proviso that:

(i) the sum of Components B and C is between about 30 and about 70 wt % of the composition.

Component A of the paintable TPO composition of this invention can comprise 100 wt % graft-modified polypropylene, or a blend of graft-modified polypropylene with nongrafted polypropylene in any proportion. Component B of the paintable TPO composition can comprise 100 wt % of the nongrafted or graft-modified homogeneously branched linear ethylene polymer, ethylene-propylene monomer rubber, ethylene-propylene-diene monomer rubber, heterogeneously branched linear ethylene polymer, styrene block copolymer, or a combination of any of these nongrafted or graft-modified components in any proportion. As here used, "graft-modified" means that the polypropylene, the homogeneously branched linear ethylene polymer, the ethylene-propylene monomer rubber, the ethylene-propylene-diene monomer rubber, the heterogeneously branched linear ethylene polymer, or the styrene block copolymer is grafted with an unsaturated organic compound containing at least one site of ethylenic unsaturation and at least one carbonyl group.

DESCRIPTION OF THE PREFERRED EMBODIMENT

The polypropylene component of this invention is a homopolymer or one or more copolymers of propylene and up to about 20 mole percent ethylene or other $\alpha$-olefin having up to about 12 carbon atoms, the polypropylene component being grafted with an unsaturated organic compound containing at least one site of ethylenic unsaturation and at least one carbonyl group. If a copolymer, it can be random, block or graft. The polypropylene component of this invention has a typical melt flow rate (as determined by ASTM D-1238,Procedure A, Conditions E and N, at a temperature of 230 C.) of between about 0.1 and 30 g/10 min, and preferably between about 0.8 and 30 g/10 min.

The homogeneously branched linear ethylene polymers are interpolymers (homopolymers, copolymers, or higher order polymers) in which any comonomer (preferably an α-olefin having from 3 to 20 carbon atoms) is randomly distributed within a given interpolymer molecule and wherein substantially all the interpolymer molecules have the same ethylene/comonomer ratio within that interpolymer. The homogeneity of the interpolymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al., Journal of Polymer Science, Poly. Phys. Ed., vol. 20, p 441 (1982), in U.S. Pat. No. 4,798,081 (Hazlitt et al.), or in U.S. Pat. No. 5,089,321 (Chum et al.) the disclosures of which are incorporated herein by reference. The SCBDI or CDBI for the linear and for the olefin polymers of the present invention is preferably greater than about 30 percent, especially greater than about 40 percent.

The homogeneously branched linear ethylene polymers used in this invention lack a measurable "high density" fraction as measured by the TREF technique (i.e., the homogeneously branched linear ethylene polymers do not contain a polymer fraction with a degree of branching less than or equal to 2 methyls/1000 carbons). The homogeneously branched linear ethylene polymers also do not contain any highly short chain branched fraction (i.e., the homogeneously branched linear ethylene polymers do not contain a polymer fraction with a degree of branching equal to or more than about 30 methyls/1000 carbons).

The terms "homogeneously branched linear ethylene polymer" means that the interpolymer does not exhibit long chain branching as measured by $^{13}$C NMR or gel permeation chromatography coupled with a differential viscosity detector. The absence of measurable long chain branching is one of the features that distinguish homogeneously branched linear ethylene polymers from homogeneously branched substantially linear ethylene polymers which are described in U.S. Pat. Nos. 5,272,236, 5,278,272, U.S. Ser. No. 08/455,302 and U.S. Ser. No. 08/454,935 both filed Aug. 18, 1995 (all of which are here incorporated by reference). Homogeneously branched substantially linear ethylene polymers are a separate and distinct class of ethylene polymers from homogeneously branched linear ethylene polymers, and the former are not used as the B component in the practice of this invention. As here used, "measureable" means that the techniques of $^{13}$C NMR and GPC/DV can detect 0.01 or more branches of 6 carbons or more per 1000 carbons.

Another feature that distinguishes the homogeneously branched linear ethylene polymers used as the B component in the practice of this invention from homogeneously branched substantially linear ethylene polymers is that the latter has a critical shear rate at onset of surface melt fracture of at least 50 percent greater than the critical shear rate at the onset of surface melt fracture of a homogeneously branched linear olefin polymer having about the same $I_2$ (melt index measured) according to ASTM D-1238, condition 190 C/2.16 kg) and $M_w/M_n$ (molecular weight distribution or polydispersity; weight average molecular weight to number average molecular weight). In other words the homogeneously branched linear ethylene polymers used as the B component in the practice of this invention have a critical shear rate at onset of surface melt fracture of less than $\frac{2}{3}$ than the critical shear rate at the onset of surface melt fracture of a homogeneously branched substantially linear ethylene polymer having about the same $I_2$ and $M_w/M_n$. As here used, "about the same" means within about 10 percent, e.g. for an $I_2$ of 5, about the same means 5± about 0.5 and for a $M_w/M_n$ of 2.5, about the same means 2.5± about 0.25.

Exemplary homogeneously branched linear ethylene polymers are described, for instance, in U.S. Pat. No. 3,645,992 (Elston). The homogeneously branched linear ethylene polymers have a single melting point, as opposed to traditional heterogeneously branched Ziegler polymerized ethylene copolymers having two or more melting points, as determined using differential scanning calorimetry (DSC). Homogeneously branched linear ethylene polymers are available from Mitsui Petrochemical Company, under the tradename Tafmer, and from Exxon Chemical Company, under the tradename Exact.

Homogeneously branched linear ethylene polymers are prepared by using single-site metallocene-based catalysts, and are characterized by a narrow molecular weight distribution. Other basic characteristics of homogeneously branched linear ethylene polymers include a low residuals content (i.e. low concentrations in the polymer of the catalyst used to prepare the polymer, unreacted comonomers, and low molecular weight oligomers made during the course of the copolymerization), a narrow comonomer distribution and a controlled molecular architecture.

While the homogeneously branched linear ethylene polymers used in the practice of this invention include homogeneously branched linear ethylene homopolymers, preferably these homogeneously branched linear ethylene polymers comprise from about 95 to 50 wt % ethylene, and about 5 to 50 wt % of at least one α-olefin comonomer, more preferably 10 to 25 wt % of at least one α-olefin comonomer. Comonomer content may be determined using infrared spectroscopy according to ASTM D-2238 Method B. Typically, the homogeneously branched linear ethylene interpolymers are copolymers of ethylene and an α-olefin of 3 to about 20 carbon atoms (e.g. propylene, 1-butene, 1-hexene, 4-methyl-1-pentene, 1-heptene, 1-octene, styrene, etc.), preferably of 3 to about 10 carbon atoms, and most typically these polymers comprise ethylene and 1-butene or 1-hexene. The density of the homogeneously branched linear olefin polymer is typically from about 0.850 to about 0.960 grams per cubic centimeter (g/cm$^3$), preferably between about 0.855 to about 0.920 g/cm$^3$, and more preferably between about 0.865 to about 0.900 g/cm$^3$, and even more preferably between about 0.865 to about 0.880 g/cm$^3$. The melt index, measured as $I_2$ (ASTM D-1238, Procedure A, Conditions E and N, at a temperature of 190 C.), is preferably from about 0.1 to about 100 g/10 min, more preferably from about 0.5 to about 2 g/10 min. The melt flow ratio, measured as $I_{10}/I_2$ (ASTM D-1238), is preferably between about 7 and about 14. The molecular weight distribution ($M_w/M_n$), measured by gel permeation chromatography (GPC), is preferably between about 1.8 and about 2.5.

The term "ethylene-propylene monomer rubber" ("EPM")refers to a noncrystalline rubbery copolymer of two or more α-monoolefins, such as copolymers of ethylene and propylene. The term "ethylene-propylene-diene monomer rubber" ("EPDM") refers to a noncrystalline rubbery copolymer of two or more α-monoolefins, such as ethylene and propylene, and a lesser quantity of a nonconjugated diene.

Suitable α-monoolefins are illustrated by the formula $CH_2=CHR$, wherein R is hydrogen or an alkyl radical of one to twelve carbon atoms. Examples of suitable α-monoolefins include ethylene; propylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; 1-4-ethyl-1-hexene; and mixtures thereof.

Suitable nonconjugated dienes include straight chain dienes such as 1,4-hexadiene; cyclic dienes such as cyclooctadiene; and bridged cyclic dienes such as ethylidene norbornene.

Grades of EPM and EPDM rubbers suitable for the practice of the invention are commercially available from Exxon Chemical Americas as VISTALON 703, 808 or 878, and from Uniroyal Chemical as ROYALENE 521 or 7565. Additional sources of commercially available grades of EPM and EPDM are reported in The Rubber World Blue Book, 1994 Edition, Synthetic Rubbers, pages 380–397.

The EPM rubber useful in the practice of the invention will typically comprise from about 30 to about 90 weight percent, preferably from about 40 to about 80 weight percent, and more preferably from about 50 to about 70 weight percent of a first α-monoolefin (preferably ethylene) and from about 10 to about 70 weight percent, preferably from about 20 to about 60 weight percent, and more preferably from about 30 to about 50 weight percent of a second α-monoolefin.

The EPDM rubber useful in the practice of the invention will typically comprise from about 30 to about 90 weight percent, preferably from about 40 to about 80 weight percent, and more preferably from about 50 to about 70 weight percent of a first α-monoolefin (preferably ethylene); from about 10 to about 70 weight percent, preferably from about 20 to about 60 weight percent, and more preferably from about 30 to about 50 weight percent of a second α-monoolefin and from about 0.5 to about 15 weight percent, preferably from about 1 to about 12 weight percent, and most preferably from about 3 to about 8 weight percent of a non-conjugated diene.

The EPM and EPDM rubbers useful in the practice of the invention will further be characterized by a Mooney viscosity of from about 20 to about 100, preferably from about 25 to about 70, and more preferably from about 25 to about 45 ML(1+4) at 100 C., as determined by ASTM D1646-81.

The term "heterogeneously branched linear ethylene polymer" refers to Ziegler polymerized linear low density polyethylene or Ziegler polymerized ultralow density polyethylene. Heterogeneously branched linear ethylene polymers are copolymers of ethylene and an alpha-olefin having a distribution of branching which includes a highly branched portion, a medium branched portion, and an essentially linear portion. Heterogeneously branched linear ethylene polymers are available from The Dow Chemical Company under the trademarks ATTANE and DOWLEX. The heterogeneously branched linear ethylene polymer useful in the practice of the invention will have a density of from about 0.890 to about 0.960 g/cm$^3$, preferably from about 0.890 to about 0.920 g/cm$^3$. The heterogeneously branched linear ethylene polymer useful in the practice of the invention will have a melt index of from about 0.1 to about 100 g/10 min, preferably from about 0.5 to about 2 g/10 min (as determined by ASTM D-1238, Procedure A, Conditions E and N, at a temperature of 190 C.).

The term "styrene block copolymer" means an elastomer having at least one block segment of a styrenic monomer in combination with saturated or unsaturated rubber monomer segments. The structure of the styrene block copolymers useful in the present invention can be of the linear or radial type, and of the diblock or triblock type. Styrene block copolymers are available from Dexco Polymers under the trademark VECTOR, from Shell Oil Company under the trademark KRATON, and from Phillips Petroleum, under the trademark SOLPRENE.

Suitable styrene block copolymers having unsaturated rubber monomer units include, but are not limited to, styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The styrenic portion of the block copolymer is preferably a polymer or interpolymer of styrene and its analogs and homologs, including α-methylstyrene, and ring-substituted styrenes, particularly ring-methylated styrenes. The preferred styrenics are styrene and α-methylstyrene, with styrene being especially preferred.

The rubber portion may be either unsaturated or saturated. Block copolymers with unsaturated rubber monomer units may comprise homopolymers of butadiene or isoprene and copolymers of one or both of these two dienes with a minor amount of styrenic monomer. When the monomer employed in butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP).

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers, and the like.

Hydrogenation of block copolymers with unsaturated rubber monomer units may be effected by use of a catalyst comprising the reaction products of any aluminum alkyl compound with nickel or cobalt carboxylates or alkoxides under such conditions as to substantially completely hydrogenate at least about 80% of the aliphatic double bonds while hydrogenating no more than about 25% of the styrenic aromatic double bonds. Preferred block copolymers are those where at least about 99% of the aliphatic double bonds are hydrogenated while less than about 5% of the aromatic double bonds are hydrogenated.

The proportion of the styrenic blocks is generally between about 8 and about 65% by weight of the total weight of the block copolymer. Preferably, the block copolymers contain from about 10 to about 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of about 5,000 to about 125,000, preferably from about 7,000 to about 60,000, while the rubber monomer block segments will have number average molecular weights in the range of about 10,000 to about 300,000, preferably from about 30,000 to about 150,000. The total number average molecular weight of the block copolymer is typically in the range of about 25,000 to about 250,000, preferably from about 35,000 to about 200,000. These molecular weights are most accurately determined by tritium counting methods or osmotic pressure measurements.

Any unsaturated organic compound containing at least one site of ethylenic unsaturation (e.g. at least one double bond), and at least one carbonyl group (—C═O) that will be grafted to polypropylene or a homogeneously branched linear ethylene polymer, ethylene-propylene monomer rubber, ethylene-propylene-diene monomer rubber, heterogeneously branched linear ethylene polymer, or styrene block copolymer, as described above, can be used in the practice of this invention. Representative unsaturated organic compounds that contain at least one carbonyl group are the ethylenically unsaturated carboxylic acids, anhydrides, esters and their salts, both metallic and nonmetallic. Preferably, the organic compound contains ethylenic unsaturation conjugated with the carbonyl group. Representative compounds include maleic, fumaric, acrylic, methacrylic, itaconic, crotonic, α-methyl crotonic, cinnamic, and the like, acids and their anhydride, ester and salt derivatives, if any. Maleic anhydride is the preferred unsaturated organic compound containing at least one site of ethylenic unsaturation and at least one carbonyl group.

The unsaturated organic compound content of the grafted polypropylene and of the optionally grafted homogeneously branched linear ethylene polymer, EPM rubber, EPDM rubber, heterogeneously branched linear ethylene polymer, and styrene block copolymer is at least about 0.01 wt %, preferably at least about 0.1 wt %, and more preferably at least about 0.5 wt %, based on the combined weight of the polymer and the organic compound. The maximum amount of unsaturated organic compound content can vary to convenience, but typically it does not exceed about 10 wt %, preferably it does not exceed about 5 wt %, and more preferably it does not exceed about 2 wt %. The unsaturated organic compound can be grafted to the base polymer by any known technique, such as those taught in U.S. Pat. No. 3,236,917 and U.S. Pat. No. 5,194,509 both of which are incorporated herein by reference. For example, in the '917 patent the base polymer is introduced into a two-roll mixer and mixed at a temperature of 60 C. The unsaturated organic compound is then added along with a free radical initiator, such as, for example, benzoyl peroxide, and the components are mixed at 30 C. until the grafting is completed. In the '509 patent, the procedure is similar except that the reaction temperature is higher, e.g. 210 to 300 C., and a free radical initiator is not used.

An alternative and preferred method of grafting is taught in U.S. Pat. No. 4,950,541, the disclosure of which is also incorporated herein by reference, by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Representative of the interpolymers (which include homopolymers, copolymers and higher order polymers) of ethylene and an α,β-unsaturated carbonyl comonomer are copolymers of ethylene and acrylic acid or methacrylic acid (EAA or EMAA) and their ionomers (e.g. their metal salts), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to EAA and EMAA (and their derivatives), these materials are usually produced by the free radical copolymerization of ethylene with acrylic acid or methacrylic acid. The resulting interpolymers have carboxylic acid groups along the backbone and/or side chains of the interpolymers which in the case of their ionomers, can be subsequently neutralized or partially neutralized with a base. Preferably, these interpolymers contain between about 3 and about 20, more preferably between about 5 and about 15, and most preferably between about 8 and about 12 percent by weight of acrylic acid or methacrylic acid monomer units in the polymer chain. The melt index of these interpolymers is in the range of about 0.5 to about 1500, preferably in the range of about 5 to about 300 g/10 min, as determined by ASTM D-1238 Procedure A, Conditions E and N, at a temperature of 190 C.

With respect to ECO and EPCO polymers, the classes of materials described in U.S. Pat. No. 4,916,208 to Klingensmith, the disclosure of which is incorporated herein by reference, are illustrative of the classes of ECO and EPCO polymers that can be used in the practice of this invention. Such polymers can be linear alternating copolymers or random copolymers.

Preferably, the graft-modified polypropylene component comprises between about 40 and 60 wt %, more preferably between about 45 and about 55 wt %, of the paintable thermoplastic composition. Preferably, the graft-modified polypropylene component comprises at least about 50 wt %, based on the weight of this component, graft-modified polypropylene, more preferably at least about 75 wt % graft-modified polypropylene, with the balance being nongrafted polypropylene. Most preferably, the graft-modified polypropylene component is 100 percent graft-modified polypropylene.

The nongrafted or graft-modified homogeneously branched linear ethylene polymer, ethylene-propylene monomer rubber, ethylene-propylene-diene monomer rubber component, heterogeneously branched linear ethylene polymer, styrene block copolymer, or combination thereof, of the composition is provided in an amount between about 10 and about 40 wt %, preferably between about 10 and about 30 wt %, and more preferably between about 15 and about 25 wt %, of the composition.

While the homogeneously branched linear ethylene polymer, the ethylene-propylene monomer rubber, the ethylene-propylene-diene monomer rubber, the heterogeneously branched linear ethylene polymer, and the styrene block copolymer may be wholly or partially graft-modified, such polymers will preferably be used in the nongrafted form. That is, the respective amounts of nongrafted and graft-modified polymer can vary to convenience, although a preponderance (i.e. greater than about 50 wt %) of nongrafted polymer is preferred. As between graft-modified and nongrafted polymers, the more preferred composition of this component is at least about 75 wt % nongrafted polymer, with a composition of 100 percent nongrafted polymer being most preferred.

The paintable TPO will comprise from about 5 to about 50 wt % of an interpolymer of ethylene and an α,β-unsaturated carbonyl group-containing monomer. The preferred amount of the interpolymer of ethylene and the monomer containing an α,β-unsaturated carbonyl group is between about 10 and about 40 wt %, more preferably between about 20 and about 30 wt %, based on the weight of the TPO. When an interpolymer of ethylene and a monomer containing an α,β-unsaturated carbonyl group is employed, the interpolymer will preferably be an interpolymer of ethylene and acrylic acid, most preferably an interpolymer of ethylene and acrylic acid containing about 3 to about 20 wt % acrylic acid monomer, based on the weight of the interpolymer.

The compositions of the invention may contain additives, to the extent that the presence of such additives does not interfere with the performance of the compositions, e.g. their paintability. For instance, processing aids such as calcium stearate; primary antioxidants such as IRGANOX 1010 or 1076 phenolic antioxidants (available from Ciba-Geigy Corporation), secondary antioxidants such as IRGANOX 168 phosphite (available from Ciba Geigy Corporation) or SANDOSTAB PEPQ phosphonite (available from Sandoz Chemicals Corporation); UV radiation stabilizers such as carbon black; fillers such as talc, calcium carbonate, clay, mica, silica, glass fibers, pecan shells; etc.

One preferred embodiment of this invention comprises a paintable, thermoplastic composition consisting essentially of, in wt % based upon the weight of the composition:

A. about 40 to about 60 percent graft-modified polypropylene;

B. about 10 to about 30 percent nongrafted or graft-modified homogeneously branched linear ethylene polymer, ethylene-propylene monomer rubber, ethylene-propylene-diene monomer rubber, heterogeneously branched linear ethylene polymer, styrene block copolymer, or a combination thereof; and C. about 10 to about 40 percent interpolymer of ethylene and an α,β-unsaturated carbonyl comonomer, preferably one or more of EAA, EMAA, EVA, ECO, EPCO and ECOAA;

with the proviso that the sum of Components B and C is between about 40 and 60 wt % of the composition.

Another preferred embodiment of this invention is a paintable thermoplastic composition comprising, in wt % based upon the weight of the composition:

A. about 45 to about 55 percent of graft-modified polypropylene;

B. about 15 to about 25 percent nongrafted or graft-modified homogeneously branched linear ethylene polymer, ethylene-propylene monomer rubber, ethylene-propylene-diene monomer rubber, heterogeneously branched linear ethylene polymer, styrene block copolymers, or combination thereof; and C. about 20 to about 30 percent of interpolymer of ethylene and an α,β-unsaturated carbonyl comonomer, preferably one or more of EAA, EMAA, EVA, ECO, EPCO and ECOAA;

with the proviso that the sum of Components B and C is between about 45 and about 55 wt % of the composition.

The components of the composition of this invention are mixed with one another in any conventional manner that insures the creation of a relatively homogeneous blend. If the blend is molded into a finished article by extrusion, the individual components are typically introduced into the extruder separately and mixed within it prior to extrusion. If the blend is molded by a compression or injection technique, then the three components are first well mixed by any conventional means, e.g., roller mill, agitator, etc., and then introduced as a homogeneous mass into the mold.

In another embodiment of this invention, the graft-modified polypropylene or graft-modified homogeneously branched linear ethylene polymer, ethylene-propylene monomer rubber, ethylene-propylene-diene monomer rubber, or heterogeneously branched linear ethylene polymer is respectively "let down" or diluted with nongrafted polypropylene or nongrafted homogeneously branched linear ethylene polymer, ethylene-propylene monomer rubber, ethylene-propylene-diene monomer rubber, heterogeneously branched linear ethylene polymer, or a styrene block copolymer, prior to its use as a blend component. For example, after the graft-modified homogeneously branched linear ethylene polymer has been prepared as described in U.S. Pat. No. 4,950,541, it is then back-blended in an extruder with nongrafted homogeneously branched linear ethylene polymer to a predetermined dilution. Let down or dilution ratios will vary with the ultimate application of the thermoplastic composition, but weight ratios between 1:10 and 10:1 are typical.

The paintable TPO compositions of this invention exhibit several desirable properties. First, these compositions are paintable with conventional paints without prior application of a primer or prior surface treatment of the molded article.

Second, these materials demonstrate excellent heat resistance which is an important corollary property to paintability. In commercial applications, such as molded automobile parts, paints are often cured in an oven at temperatures in excess of 200 F. The molded article must not only demonstrate good adhesion to the paint, but it must also demonstrate good resistance to the cure temperature.

Third, molded articles made from the compositions of this invention demonstrate good low temperature impact resistance. Again, this is an important property in certain commercial applications, such as molded, exterior automobile parts, and the disclosures of pending application U.S. Ser. No. 08/045,330 filed Apr. 8, 1993, and U.S. Ser. No. 08/194,236 filed Feb. 10, 1994, now U.S. Pat. No. 5,576,374, both of which are incorporated herein by reference, are informative in this regard.

Fourth, the recyclability of fabricated articles made from the compositions of this invention is enhanced relative to the recyclability of fabricated articles made from similar but conventional compositions. Recycled articles, e.g. automobile fascia, are ground into relatively small particles, and then blended with fresh polymer. With conventional compositions, the paint attaches to the article through the action of a primer or a surface pretreatment but under the conditions of recycling, this surface treatment is lost and the components separate. Once separated, compatibility is lost (due to the polar nature of the paint and the nonpolar nature of the polymer) and the integrity of the recycle melt (i.e. paint, primer (perhaps), recycled polymer and fresh polymer), and any articles made from the melt, is degraded.

With the compositions of this invention, however, the paint and polymer are compatible (both are polar in nature) and as such, the conditions of recycling are not detrimental to the integrity of the recycle melt or the articles made from the melt. In other words, the compositions of this invention have compatibility with respect to both the surface and bulk matrix of the polymer formulation, while the conventional compositions have compatibility with the surface but not the bulk matrix of the polymer formulations. This compatibility characteristic is particularly useful in the recycling of painted automobile fascia fabricated from compositions comprising graft-modified homogeneously branched linear ethylene polymers and polypropylene-based TPO.

The fabricated articles of this invention can be prepared by known thermoplastic fabrication methods, and particularly by known thermoplastic molding methods, such as injection, compression, blow, rotational, reaction injection and molding techniques. Also, the fabricated articles of this invention can be painted by known coating methods, including spray paint applications and in-mold coating techniques.

In view of their applicability in automotive applications, the compositions of the invention, when formed into a molded part, will preferably be characterized by an IZOD impact strength (as determined by ASTM D-256) of from about 0.5 ft-lb/in to "no break", preferably from about 3 to about 20 ft-lb/in, and more preferably from about 5 to about 15 ft-lb/in.

The following examples are illustrative of certain specific embodiments of this inventions. All parts and percentages are by weight unless otherwise noted.

SPECIFIC EMBODIMENTS

Sample Preparation

The following materials are used in the preparation of the test samples:

| Material | Description |
|---|---|
| Graft-Modified Polypropylene | Admer ® QF 500 A manufactured and sold by Mitsui. Polypropylene-based polymer grafted with 1.5 wt % maleic anhydride. The melt index is 3.0 g/10 min. as measured by ASTM D-1238, Procedure A, Conditions E and N, at a temperature of 230 C., and a density of 0.90 g/cm$^3$ |
| Homogeneously branched linear ethylene polymer | TAFMER P0180 manufactured and sold by Mitsui Petrochemical, having a density of 0.87 g/cm$^3$ and a melt index of 3.9 g/10 min. |
| Graft-modified homogeneously branched linear ethylene polymer | TAFMER P0180 manufactured and sold by Mitsui Petrochemical, grafted with 1.3 wt % maleic anhydride. The modified product has a melt index of 0.34 g/10 min and a density of 0.88 g/cm$^3$. |
| Graft-modified heterogeneously branched linear ethylene polymer | Ultralow density ethylene/octene copolymer prepared via a solution polymerization process using a magnesium chloride supported Ti (O-iPr)$_4$ catalyst, prepared substantially in accordance with the method of USP 4,612,300 (Ex. P) and having a molar Mg/Al/Ti ratio of 40/12/3. The ultralow density polyethylene has a density of 0.906 g/cm$^3$ and a melt index of 3.4 g/10 min, and is grafted with 0.86 wt % maleic anhydride. The graft-modified product has a melt index of 0.46 g/10 min and a density of 0.908 g/cm$^3$. |
| EAA | PRIMACOR ® 3460, an interpolymer of ethylene and acrylic acid sold by The Dow Chemical Company containing 9.7 wt % acrylic acid. Melt index = 20 g/10 min. |

The graft-modified homogeneously branched linear ethylene polymer and the heterogeneously branched linear ethylene polymer are grafted with maleic anhydride (MAH) according to the procedures described in U.S. Pat. No. 4,950,541. The graft-modified polymer contains 1.3 wt %, based on the weight of the polymer, of grafted MAH.

The polymers are dry-mixed at certain indicated weight ratios, and the dry mix is then fed into a Werner-Pfleiderer ZSK-30 twin-screw extruder operated at about 200 C. The blends are made in one extrusion pass.

Injection molded samples are prepared using a 50 ton Negri-Bossi Injection Molder operated with a barrel temperature between about 200 and 250 C., a barrel pressure of 40 bars, cooling mold temperature of 30 C. and a residence time in the cooling mold of about 12 seconds. The samples are formed into 2.5"×6.5"×0.075" plaques. Table 1 describes the composition of four different plaques.

TABLE 1

| | | | Composition of Test Plaques | | |
|---|---|---|---|---|---|
| Sample | Graft-Modified Polypropylene | Homogeneously branched Linear ethylene polymer | Graft-Modified homogeneously branched Linear Ethylene Polymer | Graft-Modified heterogeneously branched Linear Ethylene Polymer | EAA |
| C-1 | 100 | — | | — | — |
| 1 | 50 | 20 | | — | 30 |
| 2 | 50 | — | 20 | — | 30 |
| 3 | 50 | — | | 20 | 30 |

Paint Adhesion Tests and IZOD Impact Data

The plaques are washed and then one coat of automotive paint is applied to each. The paint, a heat-cured melamine formaldehyde cross-linked polyurethane or polyester, is baked (cured) at 250 F. (121 C.). Each plaque is given a single base coat (no primer), and is then baked for 40 minutes.

On the fourth day after curing, the paint strength is at or near maximum. Paint adhesion is determined using the crosshatch and tape peel test of ASTM D-3359-87 and the dime scrape test according to ASTM-9506-P.

Comparative sample C-1 fails paint adhesion and dime scrape tests, indicating that graft-modified polypropylene is not paintable. In contrast, Examples 1, 2, and 3 pass the paint adhesion and dime scrape tests.

The IZOD Impact Strength of the polymers is measured in accordance with ASTM D256 and is reported in Table 2.

TABLE 2

| | IZOD Impact Strength (ft-lb/in) |
|---|---|
| C-1 | 0.47 |
| 1 | 8.7 |
| 2 | 7.9 |
| 3 | 10.3 |

As illustrated by the data set forth in Table 2, the polymers of the Examples are improved with respect to IZOD impact strength over graft-modified polypropylene.

Although the invention has been described in by the preceding examples, such detail is for the purpose of illustration only, and it is not to be construed as a limitation upon the invention. Many variations can be made upon the preceding examples without departing from the spirit and scope of the following claims.

What is claimed is:

1. A paintable olefinic interpolymer composition consisting essentially of, in weight percent, based upon the total weight of the composition:
   A. about 30 to about 70 percent of at least one graft-modified polypropylene;
   B. about 10 to about 40 percent of at least one nongrafted or graft-modified homogeneously branched linear ethylene polymer that does not exhibit long chain branching, ethylene propylene monomer rubber, ethylene-propylene-diene monomer rubber, heterogeneously branched linear ethylene polymer, styrene block copolymer, or a combination thereof; and C. 5 to about 50 percent of an interpolymer selected from the group consisting of ethylene/acrylic acid copolymer, ethylene/methacrylic acid copolymer, ethylene/vinyl acetate copolymer, ethylene/carbon monoxide copolymer, ethylene/carbon monoxide/acrylic acid terpolymer, and mixtures thereof;

with the proviso that the sum of Components B and C is between about 30 and about 70 wt % of the composition.

2. The composition of claim 1 in which component (A) is a blend of polypropylene and graft-modified polypropylene.

3. The composition of claim 2 in which component (A) comprises from about 50 to 100 wt % graft-modified polypropylene.

4. The composition of claim 3 in which component (B) is between about 10 and 30 wt % of the composition.

5. The composition of claim 3, in which component (B) is a blend of a graft-modified and a nongrafted homogeneously branched linear ethylene polymer, ethylene propylene monomer rubber, ethylene propylene diene monomer, heterogeneously branched linear ethylene polymer, styrene block copolymer, or a combination thereof.

6. The composition of claim 5 in which component (B) comprises from about 50 to 100 wt % nongrafted homogeneously branched linear ethylene polymer, ethylene propylene monomer rubber, ethylene propylene diene monomer rubber, heterogeneously branched linear ethylene polymer, or a combination thereof.

7. The composition of claim 5 in which component (B) comprises nongrafted homogeneously branched linear ethylene polymer having a density of from about 0.855 to about 0.920 g/cm$^3$.

8. The composition of claim 1 in which component (C) comprises between about 10 and 40 wt % of the composition.

9. The composition of claim 1 in which the graft-modified polypropylene is graft-modified with at least about 0.01 wt % maleic anhydride, based on the weight of the polypropylene.

10. The composition of claim 8 in which component (C) is an ethylene/acrylic acid copolymer.

11. The composition of claim 10 in which the ethylene/acrylic acid copolymer contains between about 3 and about 20 wt %, based on the weight of the copolymer, acrylic acid monomer units.

12. The composition of claim 1 in which component (B) is a nongrafted homogeneously branched linear ethylene polymer.

13. A fabricated article made from the composition of claim 1.

14. The fabricated article of claim 13 made by extrusion.

15. The fabricated article of claim 13 made by injection molding.

16. The fabricated article of claim 13 made by compression molding.

17. The fabricated article of claim 13, wherein said article is painted.

18. An extrudable thermoplastic polymer blend comprising the painted fabricated article of claim 13 and at least one thermoplastic polymer.

19. The polymer blend of claim 18 wherein said painted fabricated article is automobile fascia.

20. The polymer blend of claim 18 wherein said thermoplastic polymer is a thermoplastic polyolefin.

21. The polymer blend of claim 20 wherein the thermoplastic polyolefin is a polypropylene or an ethylene/propylene copolymer.

22. A paintable olefinic interpolymer composition consisting essentially of, in weight percent, based upon the total weight of the composition:

A. about 30 to about 70 percent of at least one graft-modified polypropylene;

B. about 10 to about 40 percent of at least one nongrafted or graft-modified homogeneously branched linear ethylene polymer having a critical shear rate at onset of surface melt facture of less than ⅔ than critical shear rate at the onset of surface melt fracture of a homogeneously branched substantially ethylene polymer having about the same $I_2$ and $M_w/M_n$, ethylene propylene monomer rubber, ethylene-propylene-diene monomer rubber, heterogeneously branched linear ethylene polymer, styrene block copolymer, or a combination thereof; and C. 5 to about 50 percent of an interpolymer selected from the group consisting of ethylene/acrylic acid copolymer, ethylene/methacrylic acid copolymer, ethylene/vinyl acetate copolymer, ethylene/carbon monoxide copolymer, ethylene/carbon monoxide/acrylic acid terpolymer, and mixtures thereof;

with the proviso that the sum of Components B and C is between about 30 and about 70 wt % of the composition.

* * * * *